(12) United States Patent
Liu et al.

(10) Patent No.: US 8,335,005 B2
(45) Date of Patent: Dec. 18, 2012

(54) PRINTER SYSTEM AND PRINTING METHOD FOR MAKING PAPER CRAFT

(75) Inventors: Qing-Hua Liu, Shenzhen (CN); Yong-Hui Xiao, Shenzhen (CN); Yi-Fang Wu, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 648 days.

(21) Appl. No.: 12/561,963

(22) Filed: Sep. 17, 2009

(65) Prior Publication Data
US 2010/0231956 A1   Sep. 16, 2010

(30) Foreign Application Priority Data
Mar. 13, 2009  (CN) .......................... 2009 1 0300825

(51) Int. Cl.
*G06F 3/12* (2006.01)
(52) U.S. Cl. ................. 358/1.15; 358/1.13; 358/1.18; 53/410; 53/412; 700/95; 709/203
(58) Field of Classification Search ............... 358/1.15; 53/410, 412; 700/95; 709/203
See application file for complete search history.

(56) References Cited

U.S. PATENT DOCUMENTS

| | | | |
|---|---|---|---|
| 2003/0098994 A1* | 5/2003 | Tacke | 358/1.18 |
| 2005/0023176 A1* | 2/2005 | Hyun | 206/521.1 |
| 2009/0282782 A1* | 11/2009 | Walker et al. | 53/410 |
| 2010/0222908 A1* | 9/2010 | Gombert et al. | 700/98 |
| 2010/0231955 A1* | 9/2010 | Wu et al. | 358/1.15 |

FOREIGN PATENT DOCUMENTS
WO   WO 2005000681 A2 * 1/2005

OTHER PUBLICATIONS

Liang Lu et al., "Folding Cartons with Fixtures: A motion Planning Approach", IEEE Transactions on Robotics and Automation, vol. 16, No. 4, Aug. 2000.*

* cited by examiner

*Primary Examiner* — Jacky X Zheng
(74) *Attorney, Agent, or Firm* — Altis Law Group, Inc.

(57) ABSTRACT

A printer system includes a server capable of communicating with a printer and a client. The server stores a plurality of theme templates for making three-dimensional paper crafts. Each theme template has a plurality of marks to provide indication to make the paper craft. The marks comprise a series of sequence numbers to fold the theme templates according to the sequence numbers, and an angle number to indicate a folding angle. The server accepts edited templates from the client and sends an instruction to the printer to print the edited templates.

1 Claim, 6 Drawing Sheets

PRINTER SYSTEM AND PRINTING METHOD FOR MAKING PAPER CRAFT

BACKGROUND

1. Technical Field

The present disclosure relates to printer systems and printing methods, and particularly, to a printer system and a printing method for making paper crafts.

2. Description of Related Art

In computing, a printer is a peripheral device which produces a hard copy (permanent human-readable text and/or graphics) of documents stored in electronic form. Typically, the hard copy is a physical print media such as paper or transparencies which can be useful for the design of paper crafts.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
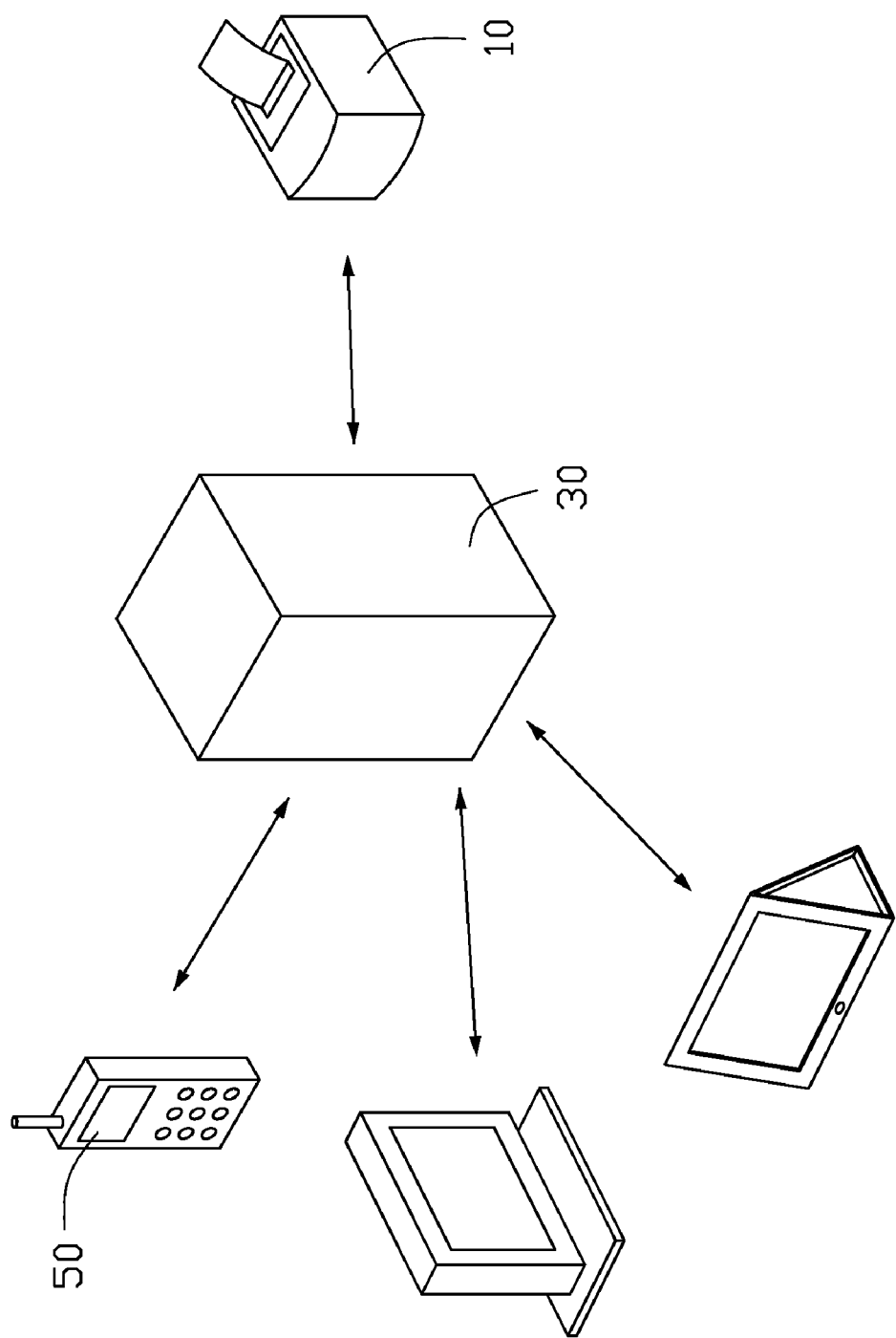
FIG. 1 is an overview of a printer system.

Referring to FIG. 1, a printer system is capable of printing paper with markings for making paper crafts, such as greeting cards, boxes, animals, flowers, and so on. The printer system includes a printer 10, a server 30 connected to the printer 10, a client 50 connected to the server 30. The client 50 may be, for example, a handset terminal, a computer, a digital photo frame and so on. The client 50 may connect with the server 30 through a wireless transfer protocol, for example, WiFi (Wireless Fidelity).

Figure 2:
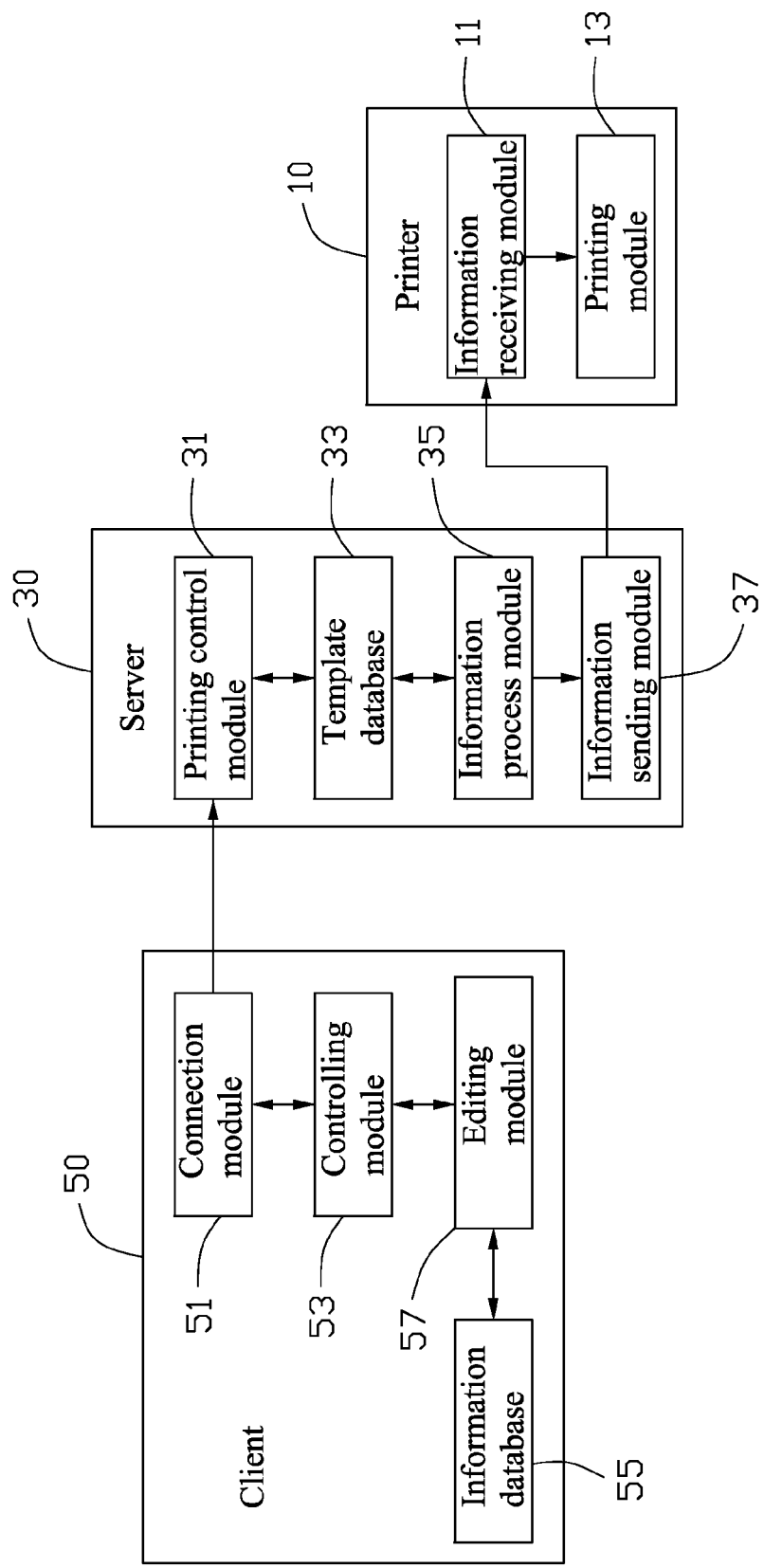
FIG. 2 is a block view of a printer system.

Referring to FIG. 2, the printer 10 includes an information receiving module 11 for receiving pre-print files and a printing module 13 for printing the pre-print files. The server 30 includes a printing control module 31, a template database 33, an information process module 35 for processing the pre-print files, and an information sending module 37 connecting with the information receiving module 11. The client 50 includes a connection module 51 connecting with the server 30, a controlling module 53 connecting with the connection module 51, an information database 55, and an editing module 52 capable of accessing the information database 55.

Figure 3:
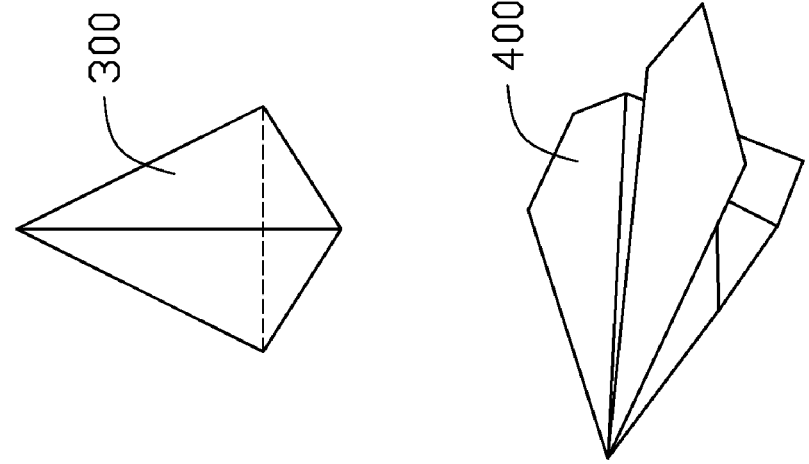
FIG. 3 is a schematic view of three-dimensional printing templates.
Figure 3:
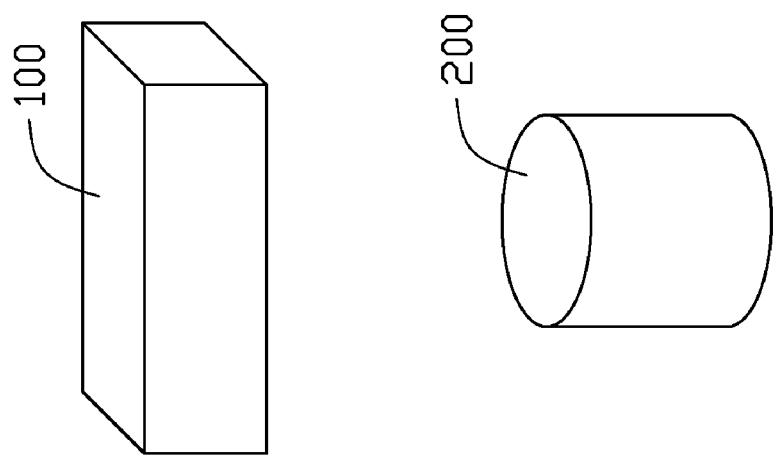
Figure 4:
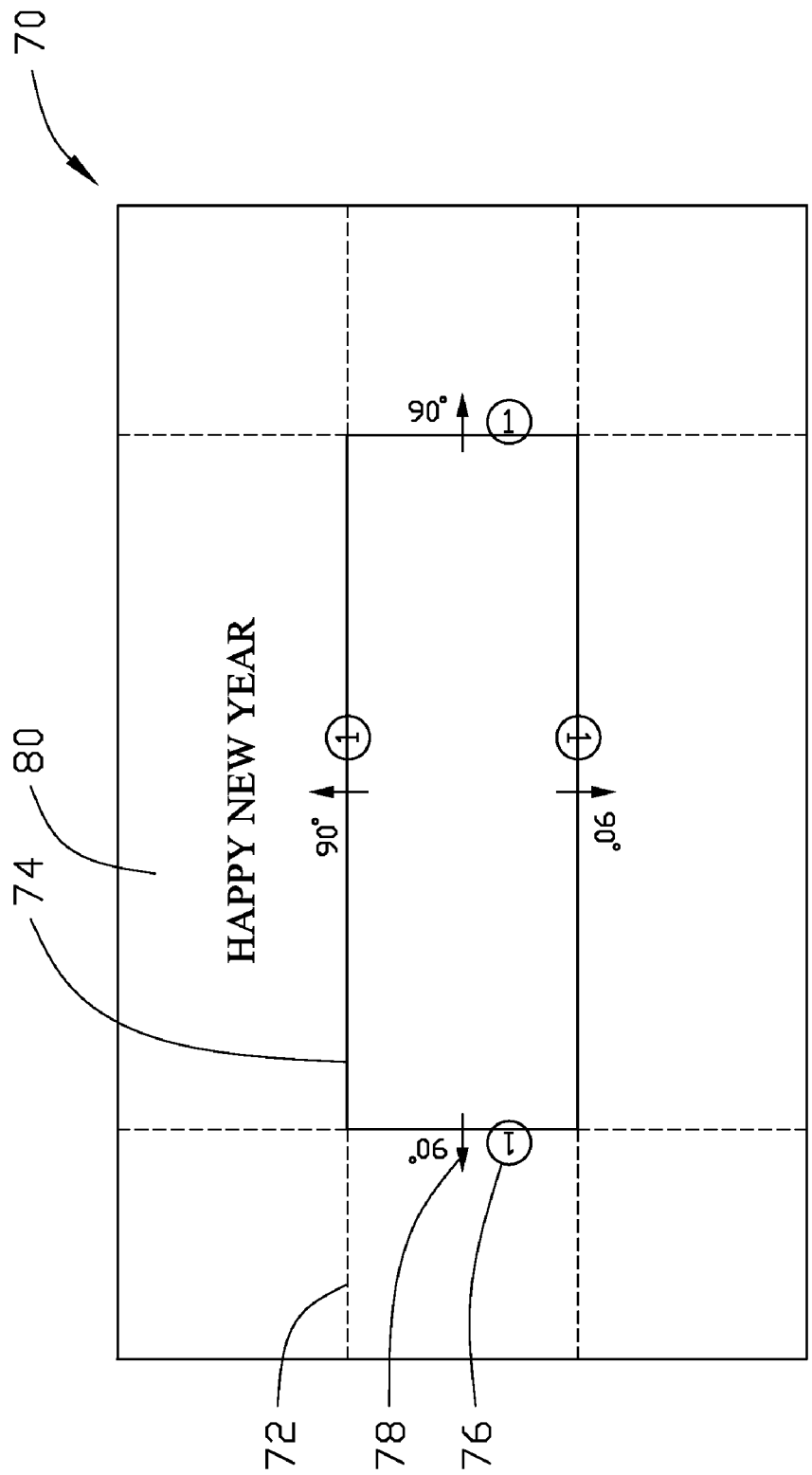
FIG. 4 is a two-dimensional folding view of a box template in FIG. 3.
Figure 5:
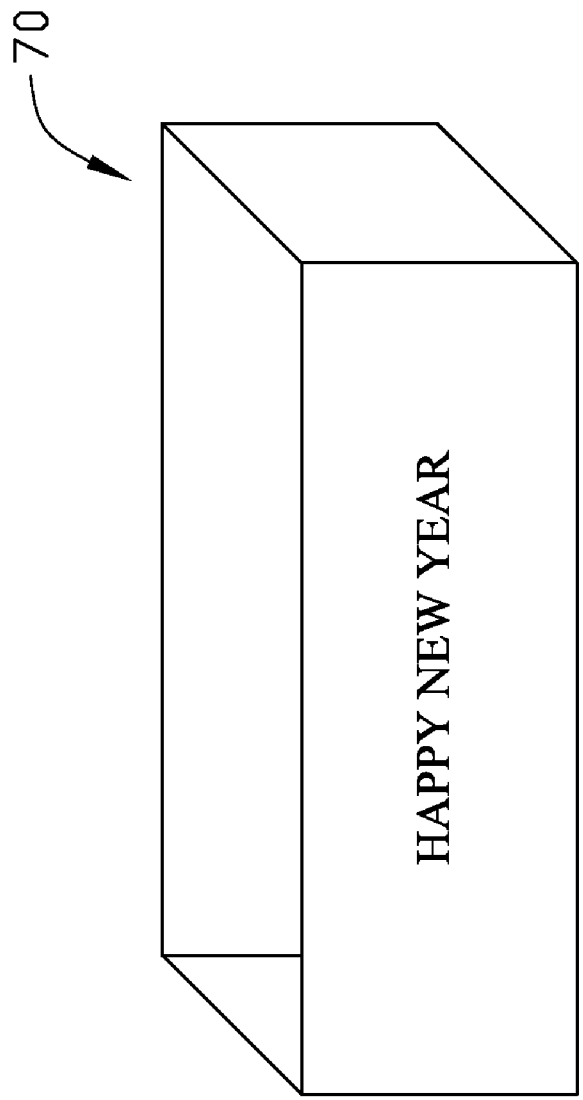
FIG. 5 is a three-dimensional view of FIG. 4.

Referring to FIG. 3, FIG. 4 and FIG. 5, the template database 33 of the server 30 stores a plurality of theme templates of paper crafts. The paper crafts may be, for example, box template 100, cylinder template 200, cone template 300, and airplane template 400. In FIG. 4, the three-dimensional effect view of the box template 100 is selected. The server 30 computes a two-dimensional folding view of the paper craft according to the three-dimensional effect view of the paper craft. The client 50 displays a two-dimensional folding view 70 of the box template 100. The two-dimensional folding view 70 of the paper craft has a plurality of dotted lines along which a user should cut the paper and a plurality of solid lines indicating where the user should fold the paper. The shape and style of the lines can be set as desired. The solid lines are marked with sequence numbers to show folding sequence and an arrow 78 to indicate a folding direction. A folding angle is shown adjacent to the arrow 78. The folding angle may range from negative 180 degrees to positive 180 degrees. A plurality of editing areas 80 is set on the box template 100 to allow addition of pictures and/or words to decorate the box template 100 through the editing module 52. The two-dimensional folding view 70 is viewed as a pre-print two-dimensional folding view after the two-dimensional folding view 70 is edited.

The client 50 displays the pre-print two-dimensional folding view and the corresponding three-dimensional effect view (how the selected template will look after it is printed out and cut and folded). The information database 55 of the server 30 stores suitable paper configurations according to the pre-print two-dimensional folding view. The paper configurations may be, for example, a horizontal, a vertical, or a tilted paper configuration. The printer 10 is capable of printing the pre-print two-dimensional folding view on a paper. Users can fold the paper according to the two-dimensional folding view.

Figure 6:
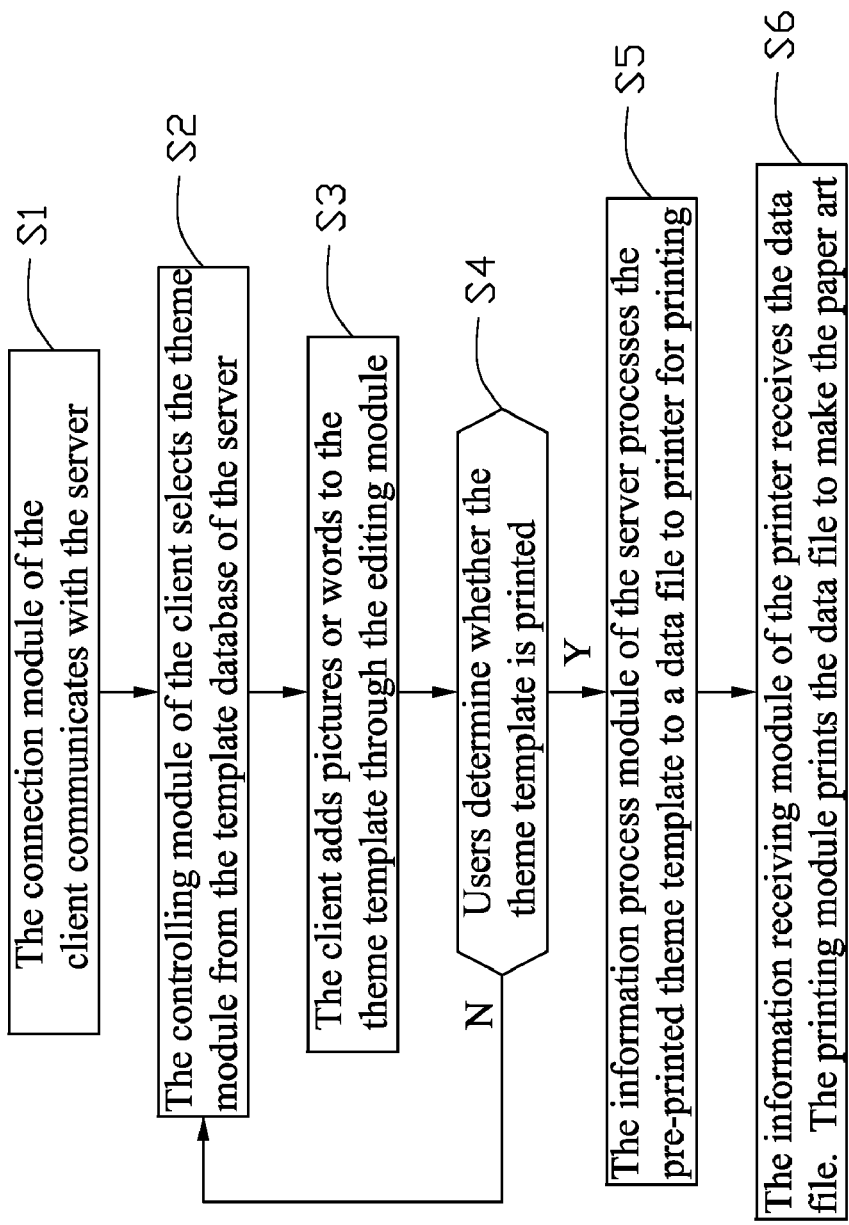
FIG. 6 is a flow chart of a printing method.

Referring to FIG. 6, a printing method includes the following steps:

S1: the connection module 51 of the client 50 communicates with the server 30, and the printing control module 31 of the server 30 is started.

S2: the client 50 selects a theme module. The controlling module 53 of the client 50 selects the theme module from the template database 33 of the server 30.

S3: the client 50 adds pictures or words to the theme template through the editing module 57, and chooses the paper configuration.

S4: users determine whether the theme template is printed. If printing, skip to S5; If not printing, return S2.

S5: the information process module 35 of the server 30 processes the preprint theme template to a data file to printer 10 for printing. The information sending module 37 sends the data file to the printer 10.

S6: the information receiving module 11 of the printer 10 receives the data file. The printing module 13 prints the data file to make the paper craft.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A printing method, comprising:
    establishing a connection between a client and a server;
    selecting a three-dimensional effect view of a paper craft;
    computing a two-dimensional template of the paper craft according to the three-dimensional effect view of the paper craft; the two-dimensional template having a plurality of markings for making the paper craft, the markings comprising a plurality of sequence numbers to fold the theme template according to the sequence numbers, and a plurality of folding angles to fold the theme template according to the folding angles;
    the client displaying a pre-print two-dimensional folding view and the corresponding three-dimensional effect view;
    transforming the two-dimensional template to a pre-print file by the client;
    sending the pre-print file to a printer through the server;
    printing the pre-print file to a paper with the markings to make the paper craft.

* * * * *